United States Patent [19]

Paplaski et al.

[11] 4,168,087
[45] Sep. 18, 1979

[54] TAPERED CHANNEL MODULAR MAIN FRAME

[75] Inventors: Joseph Paplaski, Chicago; Robert C. Dunn; Joseph M. Jania, both of Bolingbrook, all of Ill.

[73] Assignee: International Harvester Company, Chicago, Ill.

[21] Appl. No.: 910,244

[22] Filed: May 30, 1978

[51] Int. Cl.² .............................................. B62D 21/02
[52] U.S. Cl. ....................................... 280/785; 280/800; 414/697
[58] Field of Search .................... 280/781, 800, 785; 296/28 R; 214/138 R, 140; 180/9.2 R, 6.7

[56] References Cited

U.S. PATENT DOCUMENTS

| 1,173,594 | 2/1916  | McVicker ............................ 280/800 |
| 1,317,654 | 9/1919  | Norelius ............................. 280/794 |
| 3,047,170 | 7/1962  | Hough ............................ 214/138 R |
| 3,120,897 | 2/1964  | Van Auwelaer ...................... 214/138 |
| 3,767,254 | 10/1973 | Skanes ............................... 296/28 R |
| 4,026,428 | 5/1977  | Shumaker ........................ 214/138 R |
| 4,078,616 | 3/1978  | Hisamatsu ........................... 172/801 |

Primary Examiner—John A. Pekar
Assistant Examiner—John A. Carroll
Attorney, Agent, or Firm—Douglas W. Rudy; Ronald C. Kamp; F. David AuBuchon

[57] ABSTRACT

A vehicle frame having longitudinally spaced apart parallel tapered channel frame members extending forwardly from a unitized backhoe mounting rear frame section to a front yoke. The tapered channel frame members are narrow at the front yoke and become wider toward the midsection of the frame. These frame members are at their widest just forward of a rear axle location on the frame.

A unitized backhoe mounting rear frame section and a loader tower locate the tapered channels relative to the longitudinal center line of the frame.

10 Claims, 7 Drawing Figures

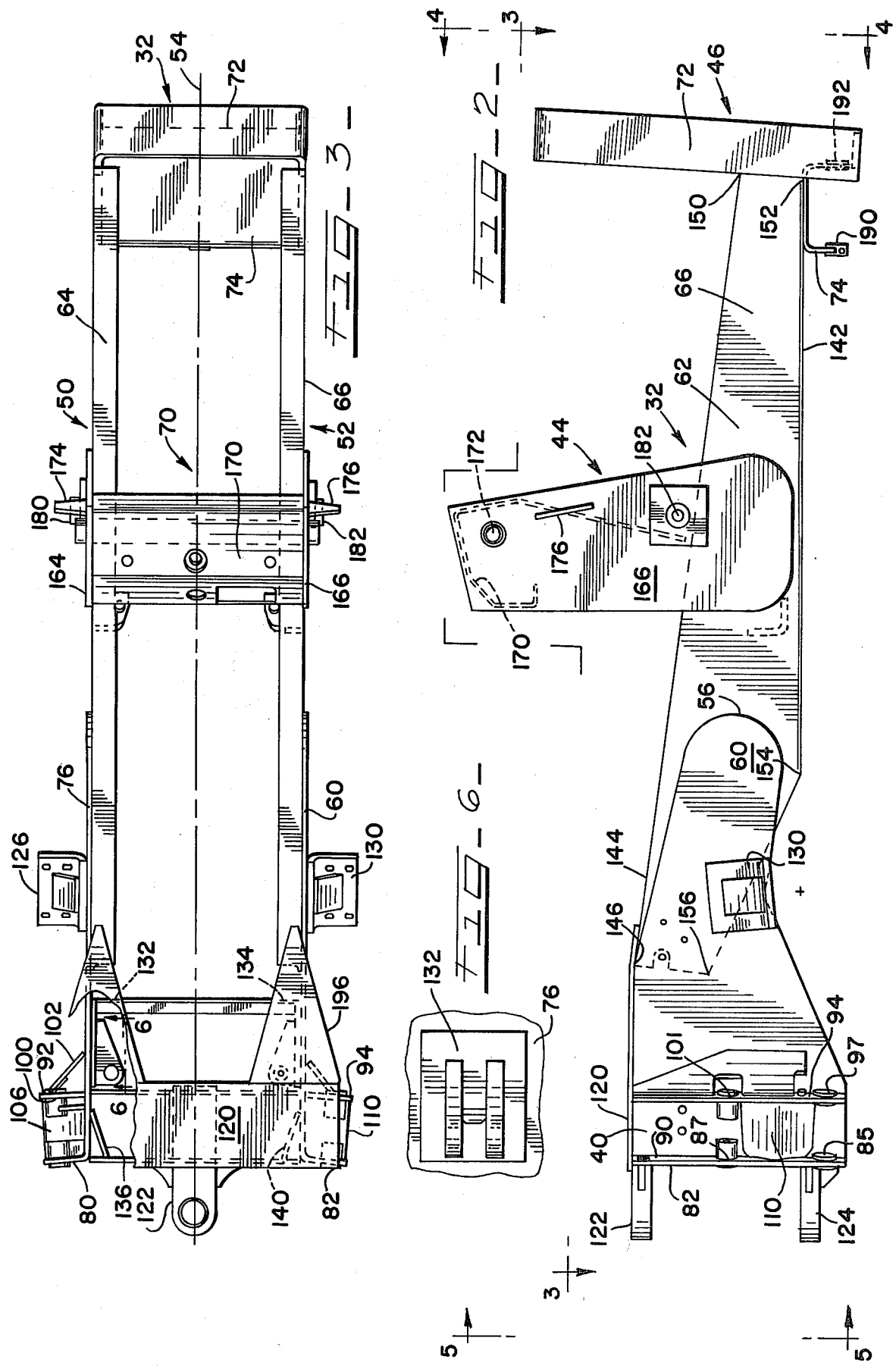

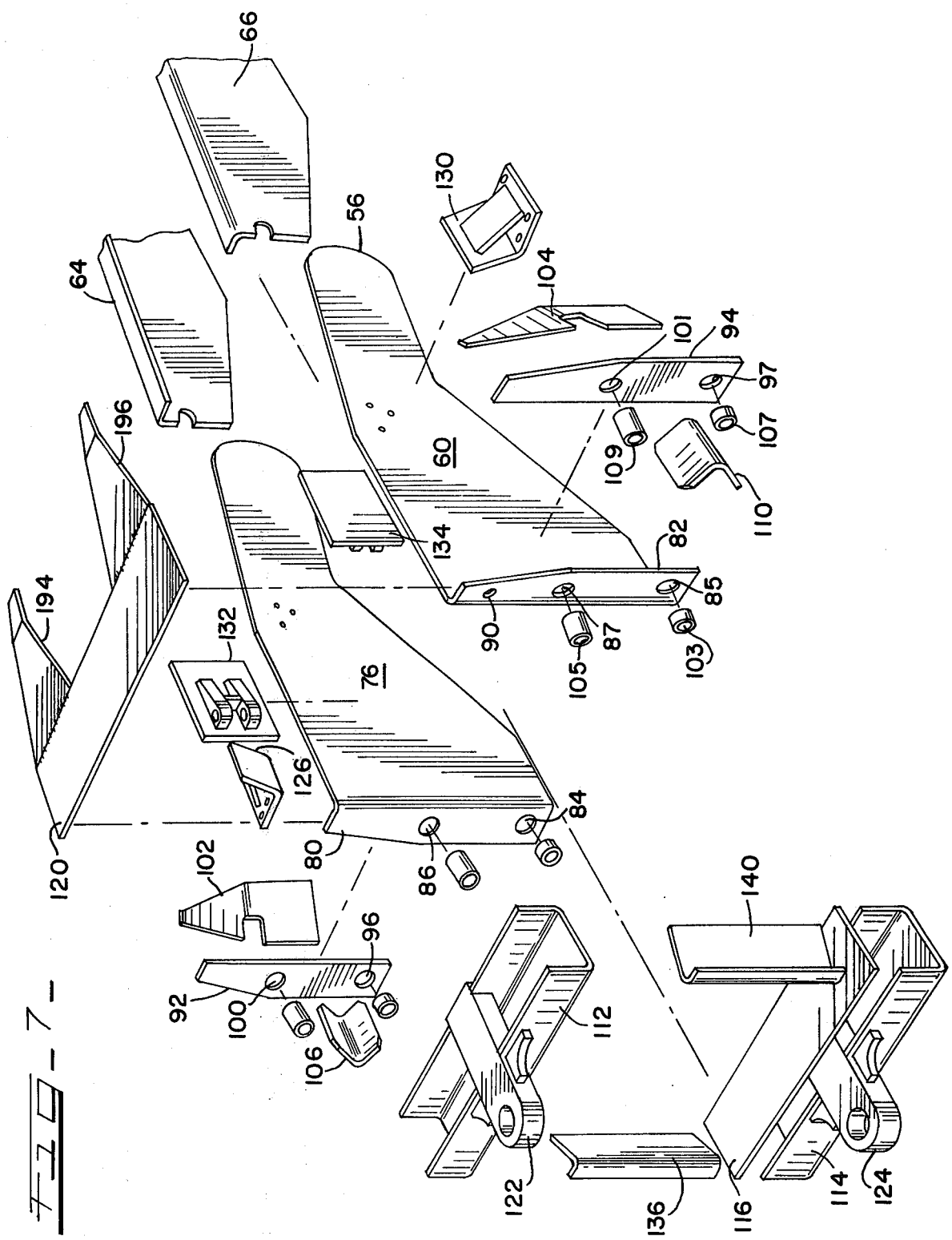

TAPERED CHANNEL MODULAR MAIN FRAME

BACKGROUND OF THE INVENTION

1. Field of the Invention:

This invention is concerned with vehicle frame structures used on tractors supporting a loader and a backhoe. Specifically a frame is provided having tapered channel forwardly extending frame rails emanating from a backhoe mounting frame at the rear section of the vehicle. A loader tower is welded to the tapered channel frame rails and is positioned to distribute loader imposed loads to the widest parts of the tapered channels.

The forward ends of each tapered channel frame member is narrower than the rear end, and is thus a weight saving advantage as the front end of the frame supports only relatively light loads.

2. Description of the Prior Art:

Prior art frame structures for loader/backhoes are generally of one of two types. A first type would include a simple tractor frame to which appendages for supporting a loader and for supporting a backhoe are welded. In other embodiments a second frame is attached to a basic tractor frame to provide mounting for the digging and stabilizing devices. The advantage of the prior art basic frame and the ancillary equipment frame combination is that the vehicle operator can append either the loader or the backhoe or both to the basic tractor frame depending on the requirements of the excavating job.

A second typical loader/backhoe frame is of a type that is more unitized. That is, a single frame supports both the vehicle drive train and the earth working attachments such as a front mounted bucket type loader and a rear mounted backhoe. Examples of this type of machine are manufactured by the assignee of record in this disclosure. The frames presently manufactured by the assignee incorporate a rear section for accompanying a backhoe and a pair of forward extending channel frame rails. A loader tower is welded to the outboard surfaces of the frame rails and a yoke or hoop is provided at the front of the frame.

A frame shown in U.S. Pat. No. 3,871,462 to Krolak, et al. was reviewed and is considerably different from the instant frame. The Krolak frame is for a crawler type vehicle. The forwardly extending frame rails are tapered box section components as contrasted to the tapered channel section components presented here. Also significant is the absence of a loader tower midway along the front frame members. Further differences include the method of attaching the rear section to the frame rails (i.e. the use of the transition plates in the instant invention) and most apparently the radically different rear end sections.

SUMMARY OF THE INVENTION

The invention resides in an improved tractor frame for use on a loader/backhoe type of excavator. Specific frame improvements include the use of tapered channel frame members extending forwardly from a rear frame section and also unique forwardly extending transition plates for attaching the rear section to the forward section.

The method of constructing or assembling the tractor frame herein disclosed encompasses a method that utilizes the rear section and the loader tower as positioning jigs for assuring proper alignment of the tapered channel section frame rails.

It is amongst the objects of this invention to provide a unitized tractor frame that is strong enough to absorb significant loads through frame distribution.

It is also an object of this invention to provide a frame that minimizes unnecessary weight in order to aid vehicle efficiency without sacrificing load carrying capacity.

Another object of this frame structure is to distribute stress to the larger sections of the frame.

Other objects and advantages of the present invention will become more readily apparent upon reference to the accompanying drawings and the following description.

BRIEF DESCRIPTION OF THE DRAWING FIGURES

FIG. 2 is a side elevation view of a vehicle frame as disclosed;

FIG. 3 is a top view of the frame shown in FIG. 2;

FIG. 6 is a broken away portion of the frame illustrating the mounting anchors for the backhoe swing cylinders; and FIG. 7 is a view showing the significant components of the rear frame section expanded away from each other.

DETAILED DESCRIPTION OF THE INVENTION

Figure 1:
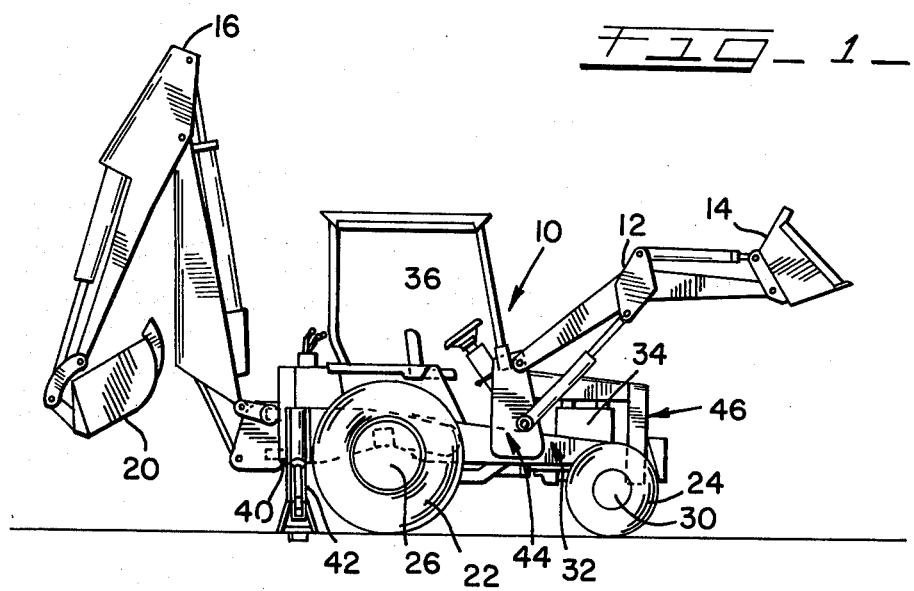
FIG. 1 is a side elevation view of a loader/backhoe vehicle typical of the type of vehicle to which the instant invention would apply.

Looking first to FIG. 1 an industrial tractor generally 10 including a loader assembly 12 for supporting and positioning a bucket shovel 14 and a backhoe assembly 16 for supporting and positioning a bucket 20 is presented. The vehicle is supported on a plurality of wheels 22 and 24 supported on a rear axle 26 and a front axle 30 respectively. The axles are attached to and support a frame generally 32 while the frame supports the tractor running gear such as the engine 34 as well as an operator's station 36. The frame 32 further carries the backhoe 16 at a rear section 40 thereof as well as a pair of deployable outrigger stabilizers one 42 shown deployed. As is typical practice one outrigger or stabilizer is mounted on each side of the rear frame section.

Other significant features discernable in FIG. 1 are the loader tower generally 44 and the front yoke generally 46.

The important details and significant features of the frame can best be seen in FIGS. 2 through 7 to which the reader is directed.

In FIG. 3 it can be seen that the frame generally 32 has a left side generally 50 and a right side generally 52 on each side of a longitudinal center line 54. The equipment carried on each side of the center line may be considered the mirror image of its counterpart for purposes of this specification.

The FIG. 2 elevation view clearly shows the various components that make up the general frame 32. The rear section 40 of the frame provides the mounting location for the backhoe, the outrigger stabilizers and the rear axle. The forward extreme of the rear section is the rounded end 56 of the right side transition plate 60. The front section 62 of the frame generally 32 includes a left (FIG. 3) and a right tapered channel side member 64 and 66 respectively, the loader tower generally 44 and the front yoke generally 46 and the transverse front axle carrier 74.

Each of these components can be described individually as follows.

The rear section of the frame, as shown in all the figures, and most easily envisioned in FIG. 7, is constructed around the two forwardly extending transition plates, namely the left side or first transition plate 76 and the right side or second transition plate 60. Each transition plate has an inboard and an outboard surface and may be considered generally "pear" shaped with the representative rounded end 56 being the top of the "pear" and the widest section at the rear of the rear section of the frame 40 the base of the "pear". The wide portion of each transition plate 76 and 60 is bent outwardly from the longitudinal center line of the frame. The included angle being greater than 90°. These bent outward portions or more properly outwardly extending tabs 80 and 82 are provided with a plurality of apertures for accommodating pins for mounting the outrigger stabilizers 42 (FIG. 1). The lowest aperture 84 and 85 in each tab locates the outrigger while the middle aperture 86 and 87 locates the outrigger extending cylinder. The upper aperture 90 is associated with retaining the outrigger in a retracted position during travel.

A first stabilizer tab 92 and a second stabilizer tab 94 are welded to the left and right transition plates 76 and 60 respectively. These tabs are also provided with lower 96 and 97 and upper apertures 100 and 101 that are aligned with apertures 84, 85 and 86, 87 in the left and right outwardly extending tabs 80 and 82 to provide a mounting location for the outrigger stabilizer device 42 and a comperable mate on the left side of the center line. Apertures for accommodating the outrigger mounting pins (which are not shown), typically apertures 85, 87, 97, 101 and their related counterparts on the left side of the vehicle, are provided with inserts (103, 105, 107 and 109) that provide a smooth interior bearing surface.

Two pairs of gussets are welded to the rear frame housing to strengthen the first 92 and second 94 stabilizer tab attachments. These gussets include left and right buttress gussets 102 and 104 which are welded to the outboard surfaces of the transition plates and the forward facing surfaces of the stabilizer tabs. The second pair of gussets are left and right bridging gussets 106 and 110 that are welded to and between the outwardly extending tabs 80 and 82 and the stabilizer tabs 92 and 94. The horizontal edges of these bridging gussets are also welded to the outboard surfaces of the transition plates.

The left side of the rear frame section is unified to the right side by an upper transverse member 112 and a lower transverse member 114 which are both channel section members (first and second) having the walls of their channel extending upwardly. The channels are welded to the inboard surfaces of the transition plates. Each channel is closed at the top thereof by top plates welded to the channel. The lower top plate 116 is also welded at it ends while the upper top plate 120 extends horizontally past the projecting outwardly extending tabs 80 and 82 and the stabilizer tabs 92 and 94. The upper top plate is welded at the intersections of all the accessible intersecting planes. Tying plates 194 and 196 extend forwardly from the leading edge of the upper top plate and are welded to the transition plates and to the channel section members.

An upper backhoe support 122 is attached to the upper transverse member 112 while the lower backhoe support 124 is attached to the lower transverse member 114. Each backhoe support is gusseted and welded in position. Each support is also provided with an aperture therethrough to accommodate the backhoe mounting apparatus.

Also welded into the back frame section are vertical left and right side bumpers 136 and 140 that extend from the lower top plate 116 to the bottom of the upper transverse member 112. The bumpers are welded along their entire periphery to the adjacent structure.

Appendages on the rear frame include left and right axle locating pads 126 and 130 respectively which are welded to the outboard surfaces of the transition plates in the vicinity of the necked down part of each plate. Welded to the inboard surfaces of the transition plates are backhoe swing cylinder anchors as shown in FIG. 6. The left and right, 132 and 134, anchors are provided with the upper and lower tabs each provided with an aperture to accommodate a pin acting as an axle for a common swing cylinder.

The front portion of the frame includes a pair of tapered channel section frame rails, the first being 64 and the second being 66, the loader tower generally 44, the front yoke generally 46 and the transverse front axle carrier 74.

The shape of the tapered channel frame members can best be seen in FIG. 2 where the lower edge 142 is generally horizontal from point 152 at the front end of the frame member to point 154, which is approximately half way between the longitudinal midpoint of the frame and the back end of the frame, and slopes upwardly to point 156 to clear the vehicle axle. The upper edge 144 slopes from a rear end point 146, corresponding to a sharp divergence from horizontal of the right transition plate 60, to a front point 150. Inwardly extending top and bottom side rails, which form the "channel" section are typically shown in FIG. 4 as 160 and 162. The top side rail extends the length of the upper edge 144 while the bottom side rail extends from the front end 152 to the point 154 on the lower edge 142. The outboard vertical surfaces of the frame rails are parallel to the longitudinal frame axis 54. Both channels are mirror images of the other.

The tapered channel frame rails are welded to the rear frame section. The outboard surfaces of the frame rails are positioned face to face against the inboard surfaces of the respective transition plates. The weld extends around the periphery of the transition plate where the transition plate contacts the tapered channel frame.

The loader tower generally 44 is composed of a pair of upwardly extending side plates the first being 164 and the second being 166. Transverse linking members include a dash board and fire wall 170 welded to the inboard surfaces of the side plates and a loader boom cross tube 172 passing through apertures at the upper part of the side plates further welded thereto. Appendages extending outwardly from the outboard surfaces of the side plates include hydraulic hose locating brackets 174 and 176, each perforated with a number of apertures, and tapered boom cylinder pins 180 and 182 also welded to the outboard surfaces of the tower side plates.

The dash board/firewall 170 (FIG. 5) is perforated at 184 for the transmission control lever (not shown), at 186 for a roll over protective structure mount and at 190 for accommodating an instrument cluster.

The loader tower straddles the front frame such that the lower inboard surfaces of the side plates are in face to face contact with the outboard surfaces of the tapered channel frame rails. A continuous weld follows the lower portion of each tower side plate to affix it to the frame rails.

Figure 4:
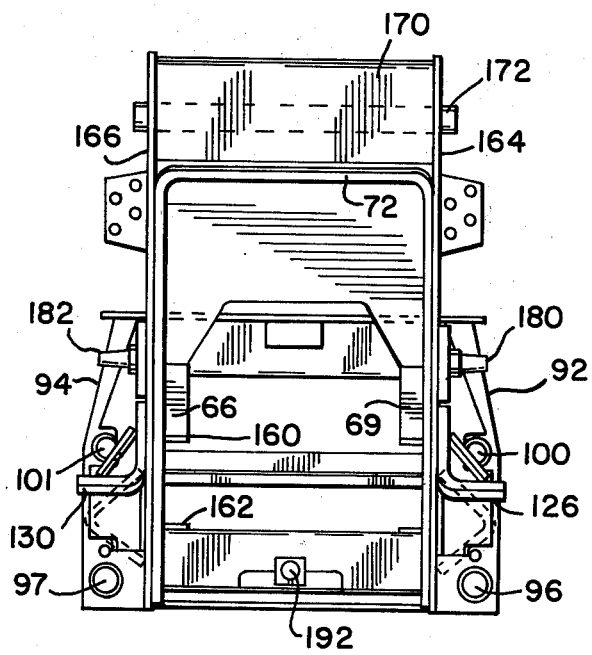
FIG. 4 is an end view of the frame of FIG. 2 from the front (right) end thereof.
Figure 5:
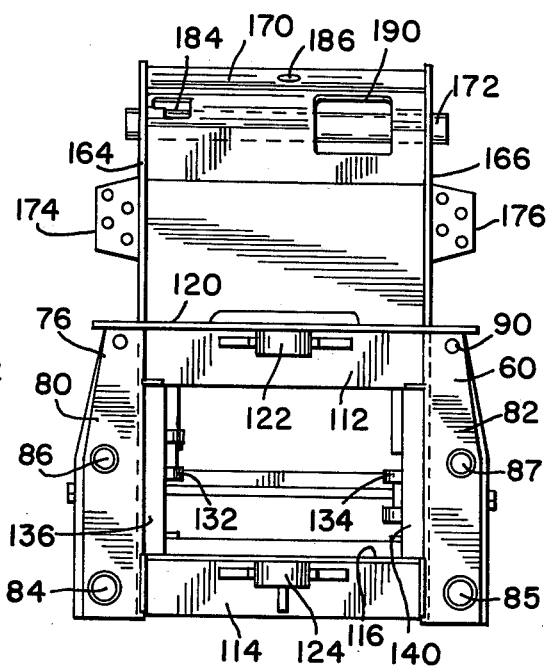
FIG. 5 is an end view of the frame shown in FIG. 2 from the rear (left) end thereof.

At the extreme front end of the frame the front yoke 72 is positioned (FIGS. 2 and 4). This hoop of bar stock is welded to the front edges of the frame rails and to the ends of the transverse front axle carrier 74 that are contacted by it. The front yoke is a continuous component having a first vertical side extending upwardly from below the lower edge of the first tapered side rail, bending inwardly toward the vehicle center line at a first transition end, continuing as a transverse component perpendicularly from the first vertical side, bending downwardly in a second transition end such that a second vertical side extends to a point below the lower edge of the second tapered side rail. Looking at the front yoke in FIG. 2 it can be seen that the yoke is tipped out of vertical such that the upper forward edge extends past the lower forward edge. This tipped condition allows the yoke to be used as a bumper. When approaching a dump truck, for instance, the vehicle operator can closely approach the truck knowing that the upper edge of the yoke will contact the truck before any other apparatus at the front of the loader/backhoe. Note also that the tapered channel frame members terminate such that point 150 is ahead of point 152, this provides the mounting surface for the tipped yoke. The transverse front axle carrier 74 is a channel section member that is provided with a pair of aligned apertures 190 and 192 for accommodating a front axle pivot pin. The front axle carrier is welded to each of the frame members as well as to the inner surfaces of the front yoke.

One of the more significant features of this frame is that the tapered channel frame rails distribute stress during the loader operation to the larger frame section at the rear of the vehicle. During loader operation a large channel section is not necessary at the front of the vehicle. By tapering the frame side rails sufficient frame strength is provided while frame weight is minimized. The wide section at the rear is used for transferring stress during the backhoe operation. The transition plate "pear" shapes are configured for stress distribution.

The specific features of the unitized frame have been carefully identified in the foregoing specification. While the invention has been described in conjunction with specific embodiments thereof it is evident that many alternatives, modifications, and variations will be apparent to those skilled in the art in light of the foregoing description. Accordingly, the appended claims are intended to embrace all such alternatives, modifications and variations as fall within their spirit and scope.

We claim:

1. A vehicle main frame having a longitudinal axis, said frame comprising:
    a pair of tapered channel frame members disposed substantially parallel to said longitudinal frame axis, one frame member on each side thereof;
    a rear frame section having a pair of forwardly extending transition plates disposed substantially parallel to said longitudinal frame axis, one of each of said transition plates welded to one of each of said tapered channel frame members, said rear frame section including an upper transverse member and a lower transverse member welded to each transition plate of said pair;
    a loader tower having a pair of upwardly extending side plates, one of each of said side plates welded to one of each of said tapered channel frame members, said loader tower including a transverse integral dashboard and firewall welded to each upwardly extending side plate of said pair;
    a front yoke welded to said pair of tapered channel frame members, said yoke extending above and below said frame members; and
    a transverse front axle carrier welded to each of said tapered channel frame members and to said front yoke.

2. The invention in accordance with claim 1 wherein an upper edge of said tapered channel frame member extends forwardly beyond a lower edge of said tapered channel frame member whereby said front yoke will be tipped out of vertical.

3. The invention in accordance with claim 1 wherein each of said forwardly extending transition plates are bent outwardly to form an outwardly extending tab at one end thereof such that an included angle between said transition plate and said outwardly extending tab is greater than 90°.

4. A vehicle main frame having a longitudinal axis, said frame comprising:
    a pair of tapered channel frame members designated first and second tapered channel frame members having outboard surfaces disposed substantially parallel to said longitudinal frame axis, one tapered channel frame member on each side of said axis, and inwardly directed top and bottom side rails, said tapered channel frame members tapered from a narrow front portion to a wide rear portion;
    a frame rear section having a pair of forwardly extending transition plates designated first and second transition plates, disposed substantially parallel to said longitudinal frame axis, each transition plate having an inboard and an outboard surface and further having an outwardly extending tab, having a plurality of apertures therein, at the rear portion thereof, said forward portion of said transition plate welded to said tapered side channels such that the inboard surfaces of said transition plates are face to face with respective outboard surfaces of said tapered side channels, said rear section also having an upper transverse member comprised of a first inverted channel section component and a upper top plate spanning the width of said inverted channel and extending beyond the top portions of each outwardly extending tab, said rear section also having a lower transverse member comprised of a second inverted channel section component and a lower top plate, each of said inverted channel sections welded to the inboard sides of said pair of said forwardly extending transition plates, said rear section also having upper and lower backhoe supports, said upper backhoe support projecting through and welded to said first inverted channel section component and said lower backhoe support projecting through and welded to said second inverted channel section component, said rear section also having a first and a second stabilizer tab having a plurality of apertures therethrough, said first and second stabilizer tabs each welded to the outboard surfaces of one of each of said forwardly extending transition plates forward of said outwardly extending tabs;

a loader tower having a pair of upwardly extending side plates designated first and second side plates, each having an inboard and an outboard surface, said loader tower further having a transverse integral dash board and fire wall welded to respective inboard surfaces of said tower side plates, the loader tower welded to the outboard surfaces of respective tapered channel frame members, the inboard surfaces of said respective first and second tower side plates are face to face with said outboard surfaces of respective first and second tapered channel frame members;

a front yoke welded to the front ends of said pair of tapered channel frame members said front yoke being a continuous component having a first vertical side extending upwardly from below the lower edge of the first of said tapered channel frame members, a first transition bend, a transverse component extending perpendicularly from said first vertical side to a second transition bend and a second vertical side extending perpendicularly downwardly from said transverse component to a point below the lower edge of the second of said tapered channel frame members; and a transverse front axle carrier welded to each of said tapered channel frame members and to said vertical side portions of said front yoke.

5. The invention in accordance with claim 4 wherein each bottom side rail extends longitudinally from a front end of said frame member to a point midway between a longitudinal midpoint of said frame member and a back end of said frame member.

6. The invention in accordance with claim 4 wherein said tapered channel frame members each have said inwardly directed bottom side rails extending horizontally from a front end of said frame member to a point midway between a longitudinal midpoint of said frame member and a back end of said frame member, and said inwardly directed top rail extending from the front of said frame member to the back end of said frame member, said inwardly directed top side rail having a slope relative to said bottom side rail such that the width of said tapered channel frame member is narrowest at the front end thereof.

7. The invention in accordance with claim 6 wherein said inwardly directed top side rail of said tapered channel frame member extends forwardly beyond said inwardly directed bottom side rail of said tapered channel frame member whereby said front yoke will be tipped out of vertical.

8. A vehicle main frame having a longitudinal axis, said frame comprising:

a first and second tapered channel frame member each having outboard surfaces, each disposed substantially parallel to said longitudinal frame axis, one frame member on each side of said axis, each frame member having inwardly directed top and bottom side rails and each frame member tapered from a narrow front portion to a wide rear portion;

a rear frame section having a pair of forwardly extending transition plates designated first and second transition plates, disposed substantially parallel to said longitudinal frame axis, each transition plate having an inboard surface and further having an outwardly extending tab at the rear portion thereof, said forward portion of said transition plates welded to said tapered side channels with the inboard surfaces of said transition plates face to face with respective outboard surfaces of said tapered side channels, said rear section having an upper and a lower transverse member welded to said pair of forwardly extending transition plates, said rear section also having upper and lower backhoe supports welded to said upper and lower transverse members respectively, said rear section also having a first and a second stabilizer tab each welded to the outboard surface of one of each of said forwardly extending transition plates forward of said outwardly extending tabs;

a loader tower having a pair of upwardly extending side plates designated first and second side plates, each having an inboard surface, said loader tower further having a transverse integral dash board and firewall welded to respective inboard surfaces of said tower side plates, the loader tower welded to the outboard surfaces of respective tapered channel frame members, the inboard surface of said respective first and second tower side plates are face to face with said outboard surfaces of respective first and second tapered channel frame members;

a front yoke welded to the front ends of said pair of tapered channel frame members, said front yoke being a continuous component having a first vertical side extending upwardly from below the lower edge of the first of said tapered channel frame members, a first transition bend, a transverse component extending perpendicularly from said first vertical side to a second transition bend and a second vertical side extending perpendicularly downwardly from said transverse component to a point below the lower edge of the second of said tapered channel frame members; and a transverse front axle carrier welded to each of said tapered channel frame members and to said vertical side portions of said front yoke.

9. The invention in accordance with claim 8 wherein said tapered channel frame members each have a bottom side rail defining a horizontal lower edge extending from a front end of said frame member to a point midway between a longitudinal midpoint of said frame member and a back end of said frame member, and a top side rail on said frame member extending from the front of said frame member to the back of said frame member, said top side rail defining an upper edge having a slope relative to said lower edge such that the width of the tapered channel frame member is narrowest at the front end thereof.

10. The invention in accordance with claim 9 wherein said upper edge of said tapered channel frame member extends forwardly beyond said lower edge of said tapered channel frame member whereby said front yoke will be tipped out of vertical.

* * * * *